(12) United States Patent
Ishibashi et al.

(10) Patent No.: US 7,118,289 B2
(45) Date of Patent: Oct. 10, 2006

(54) OPTICAL FIBER COMPOSITE FERRULE

(75) Inventors: Kousei Ishibashi, Tokyo (JP); Masahiro Shibata, Tokyo (JP); Minoru Nakamura, Tokyo (JP)

(73) Assignee: Kyoueisenzai Kabushikigaisha, Tokyo (JP)

( * ) Notice: Subject to any disclaimer, the term of this patent is extended or adjusted under 35 U.S.C. 154(b) by 0 days.

(21) Appl. No.: 10/374,625

(22) Filed: Feb. 25, 2003

(65) Prior Publication Data
US 2003/0161587 A1 Aug. 28, 2003

(30) Foreign Application Priority Data
Feb. 25, 2002 (JP) .................... P2002-048415

(51) Int. Cl.
*G02B 6/36* (2006.01)
(52) U.S. Cl. .................. 385/78; 385/73; 385/78
(58) Field of Classification Search .................. 385/72, 385/78, 77, 60, 88
See application file for complete search history.

(56) References Cited

U.S. PATENT DOCUMENTS

| | | | |
|---|---|---|---|
| 4,818,061 A * | 4/1989 | Iwano et al. .................. 385/72 |
| 4,867,525 A * | 9/1989 | DiMarco et al. .............. 385/84 |
| 5,737,467 A * | 4/1998 | Kato et al. ..................... 385/78 |
| 5,799,122 A * | 8/1998 | Jeong et al. ................... 385/60 |
| 5,975,770 A * | 11/1999 | Yanagi et al. ................. 385/78 |
| 6,147,341 A * | 11/2000 | Lemaire et al. ............... 385/37 |
| 6,435,731 B1 * | 8/2002 | Yamaguchi et al. .......... 385/78 |
| 6,447,173 B1 * | 9/2002 | Takada et al. ................ 385/78 |
| 2001/0017963 A1 | 8/2001 | Shimotsu |
| 2002/0118927 A1 * | 8/2002 | Takada et al. ................ 385/78 |
| 2003/0002817 A1 * | 1/2003 | Yamaguchi et al. .......... 385/78 |

FOREIGN PATENT DOCUMENTS

| | | |
|---|---|---|
| EP | 1122564 | 8/2001 |
| JP | 08-5866 | 1/1996 |
| JP | 10-90555 | 4/1998 |
| JP | 2000-28856 | 1/2000 |
| JP | 2000-098179 | 4/2000 |
| JP | 2001-208936 | 8/2001 |
| JP | 2001-215358 | 8/2001 |

\* cited by examiner

*Primary Examiner*—Frank G. Font
*Assistant Examiner*—James P. Hughes
(74) *Attorney, Agent, or Firm*—Brenda O. Holmes; Kilpatrick Stockton LLP

(57) ABSTRACT

An optical fiber composite ferrule 1 is disclosed as having a leading terminal member 1A made of hard material such as zirconia ceramic, and a trailing terminal member 2A made of synthetic resin having a linear expansion coefficient equal to or less than that of the leading terminal member 1A. By so forming, a stress to be imparted to an optical fiber due to surrounding temperature variation can be lessened.

6 Claims, 5 Drawing Sheets

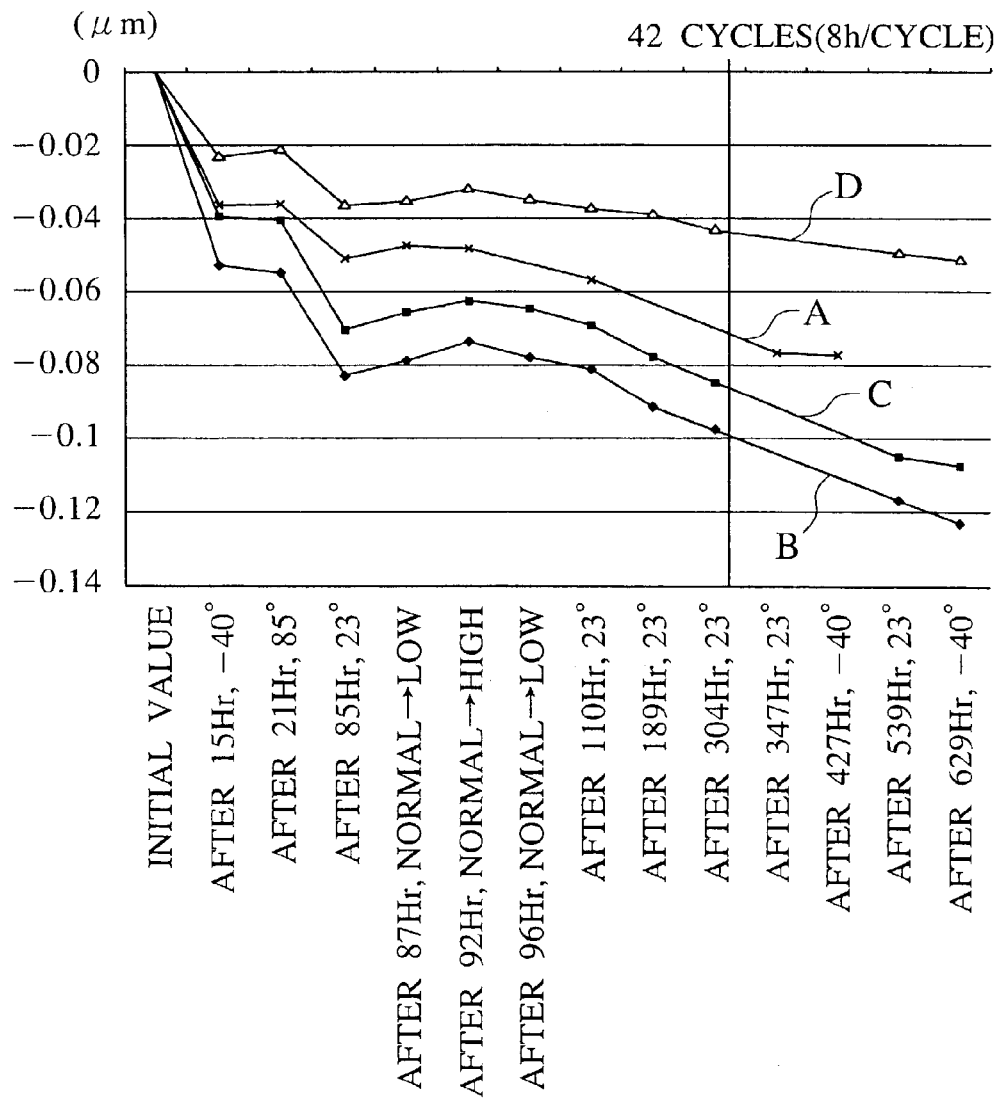

OPTICAL FIBER COMPOSITE FERRULE

BACKGROUND OF THE INVENTION

The present invention relates to a composite ferrule having high performance attributes for use in a connector for connecting optical fibers.

As shown in FIG. 1A, a ferrule for use in a connector for connecting optical fibers generally has a structure wherein one end of a ferrule base section 1 formed with an optical fiber wire insertion bore 1B is coupled to a flange section 3 formed with an optical fiber core wire guide portion 2B.

Further, for the purpose of cost reduction, the ferrule base section 1 is divided into two segments, namely a leading terminal portion made of hard material such as zirconia ceramic, and a remaining trailing terminal portion made of material such as synthetic resin with a lower hardness than the zirconia ceramic (as disclosed in (1) Japanese Patent Application Laid-Open No. 2000-28856, (2) Japanese Patent Application Laid-Open No. 2000-98179, (3) Japanese Patent Application Laid-Open No. 2001-215358 and (4) Japanese Patent Application Laid-Open No. 2001-208936.

To be more precise, a composite ferrule disclosed in the publication (1) is comprised of a sleeve formed with an insertion bore to allow an optical fiber to be inserted, and a resin molded product over-molded to the sleeve. Then, a composite ferrule disclosed in the publication (2) is comprised of a ferrule made of raw materials such as ceramic particles or metallic particles by injection molding, and a cylindrical body, which is coupled to the ferrule, with a flange made of metal. Further, a composite ferrule disclosed in the publication (3) is comprised of a cylindrical capillary formed with an aperture to insert an optical fiber wire, and a cylindrical flange made of resin, which is formed in an outer circumferential periphery of the cylindrical capillary, Furthermore, as shown in FIG. 1B, a composite ferrule disclosed in the publication (4) is comprised of a leading terminal member 1A made from ceramic, and a trailing terminal member 2A made of plastic so as to be unitarily formed with a rear end portion of the leading terminal member.

With these ferrules, for the purpose of cost reduction, only the leading terminal member 1A is formed of hard material such as zirconia ceramic, whereas the remaining trailing terminal member 2A is formed of material, such as stainless or synthetic resin, with a lower hardness than that of the leading terminal member 1A.

SUMMARY OF THE INVENTION

With the composite ferrules wherein only the leading terminal member 1A of the ferrule base section 1 is formed of the hard material such as zirconia ceramic and the trailing terminal member 2A is comprised of the material with the lower hardness than that of the leading terminal member 1A, the trailing terminal member 2A usually tends to have a higher linear expansion coefficient than that of the leading terminal member 1A.

In particular, the zirconia ceramic to be generally used in the leading terminal member 1A has a linear expansion coefficient of approximately $0.9 \times 10^{-5}$ whereas the synthetic resin to be generally used as the trailing terminal member 2A has a linear expansion coefficient of approximately $2.5 \times 10^{-5}$. On the other hand, the optical fiber has a linear expansion coefficient of approximately $0.4 \times 10^{-5}$.

Accordingly, the composite ferrules set forth above tend to have a larger linear expansion coefficient as a whole of the ferrule base section than that of the structure wherein the whole of the ferrule base section 1 (inclusive of the members 1A and 2A) is made of the hard metal. As the result, increase in a compression or tension stress to be exerted to the optical fiber due to surrounding temperature variation causes the optical fiber, fixedly secured to the ferrule, to be seriously damaged. This causes an increase in disconnection or connection loss of the optical fiber in the ferrule.

The present invention has been completed with the above view in mind and has an object to provide an optical fiber composite ferrule which enables to suppress an increase in disconnection and connection loss (insertion loss and reflection loss) of an optical fiber within the ferrule due to surrounding temperature variation by compelling the above-described composite ferrule to be configured such that an area of a ferrule base section except for a leading terminal section is made from synthetic resin with a linear expansion coefficient equal to or less than that of the leading terminal section.

According to an aspect of the present invention, there is provided an optical fiber composite ferrule comprising a ferrule base section to allow an optical fiber to be inserted, and a flange section formed at one end of the ferrule base section, wherein the ferrule base section further includes a leading terminal section made of hard material and having an optical fiber wire insertion bore, and a trailing terminal section formed of synthetic resin having a linear expansion coefficient equal to or less than that of the leading terminal section and having an optical fiber core wire guide bore.

Thus, with the optical fiber composite ferrule according to the present invention, the composite ferrule is configured such that the area of the ferrule base section except for the leading terminal section is made from synthetic resin with the linear expansion coefficient equal to or less than that of the leading terminal section, resulting in reduction in stress to be imparted to the optical fiber due to surrounding temperature variation.

BRIEF DESCRIPTION OF THE DRAWINGS

FIG. 4 is a linear graph illustrating results of temperature and moisture cycle tests conducted for the optical fiber composite ferrule 4 of the first embodiment.

DETAILED DESCRIPTION OF THE PREFERRED EMBODIMENT

Hereinafter, an embodiment of an optical fiber composite ferrule according to the present invention is described below with reference to FIGS. 2 to 6.

Figure 1A:
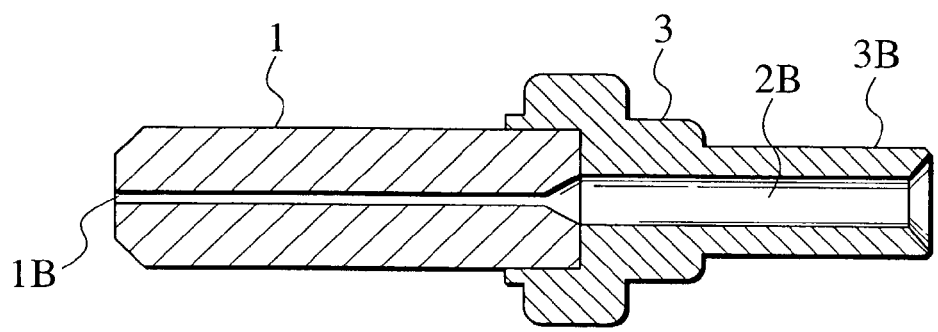
FIG. 1A is a cross sectional view of a related art ferrule.
Figure 1B:
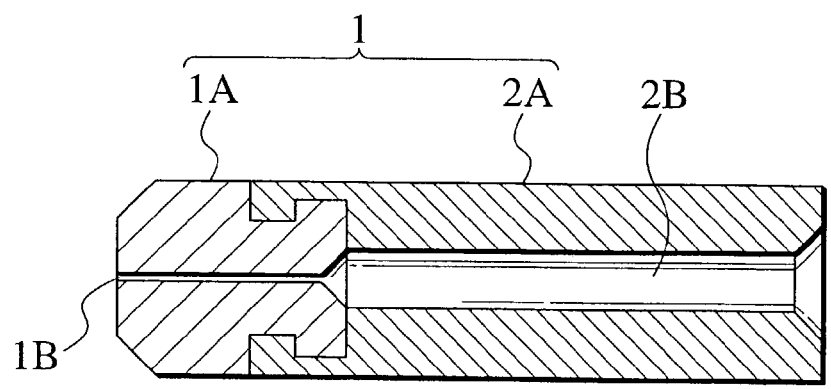
FIG. 1B is a cross sectional view of a known composite ferrule.
Figure 2A:
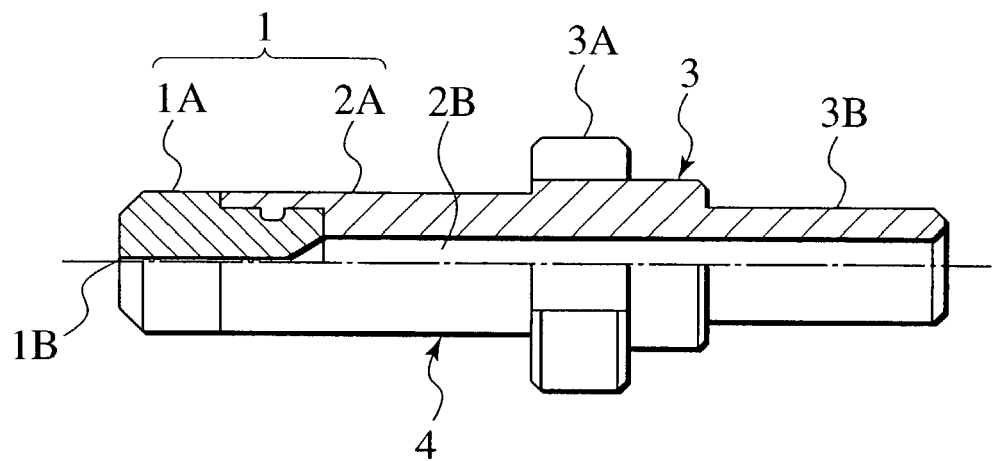
FIG. 2A is a partial cross sectional view of an optical fiber composite ferrule of a first embodiment according to the present invention.
Figure 2B:
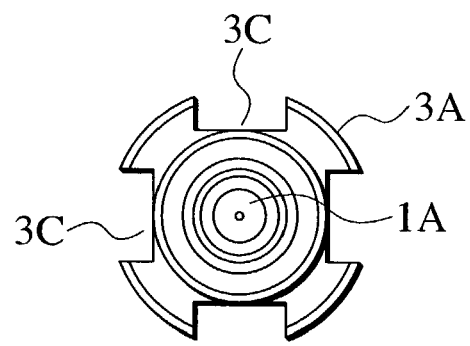
FIG. 2B is a cross sectional view.

FIG. 2A is a partial cross sectional view illustrating a structure of an optical fiber composite ferrule of a first embodiment according to the present invention, and FIG. 2B is a side view of the optical fiber composite ferrule shown in FIG. 2A.

In the first embodiment, the composite ferrule 4 is comprised of a ferule base section 1 and a flange section 3. The ferrule base section 1 includes a cylindrical leading terminal member 1A with its center formed with an optical fiber wire insertion bore 1B, and a trailing terminal member 2A formed with an optical fiber core wire guide bore 2B in communication with the optical fiber wire insertion bore 1B, with a flange member 3 being comprised of a flange 3A and a protruding portion 3B extending from the flange 3A.

The leading terminal member 1A is made from a hard material, such as a metallic alloy composed of principal ingredients including zirconia, titanium and stainless or an amorphous silicon, that enables a high dimensional precision to be obtained. On the other hand, the trailing terminal member 2A is made from synthetic resin having a linear expansion coefficient substantially equal to or less than the leading terminal member 1A, and is integrally joined with the leading terminal member 1A to form the ferrule base section 1. Also, the flange section 3 is made from the same synthetic resin as the trailing terminal member 2A and integrally formed with the trailing terminal member 2A.

Here, the synthetic resin for use in the trailing terminal member 2A of the present invention may include a resin that has a linear expansion coefficient falling in the same extent as the linear expansion coefficient ($0.4 \times 10^{-5}$) of the optical fiber, or synthetic resin that has a linear expansion coefficient substantially equal to or less than the linear expansion coefficient of zirconia ceramic.

The synthetic resin may preferably include PPS (polyphenylene sulfide), PC (polycarbonate) or PBT (polybutylene terephthalate). In order to limit the linear expansion coefficient, these resins may include carbon fibrous fillers in a volume ranging from 20 to 50%.

Further, although the shape of the flange 3A has been shown as having recessed portions 3C formed at four circumferentially spaced positions, the flange 3A may have two recessed portions or may not be formed with such recessed portions 3C.

Figure 3:
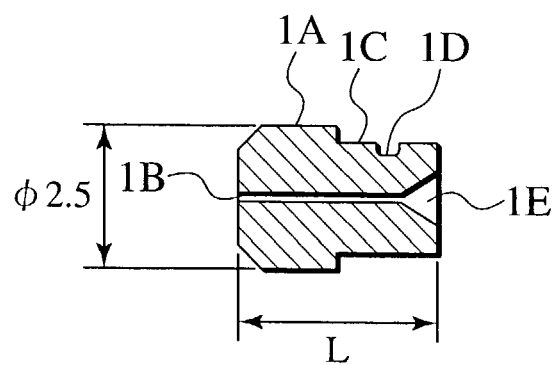
FIG. 3 is a cross sectional view of a leading terminal member 1A of the optical fiber composite ferrule shown in FIG. 2A.

Next, as shown in FIG. 3, the leading terminal member 1A has a cross sectional shape wherein a rear portion of the leading terminal member 1A is formed with a smaller diameter portion 1C than the leading terminal member 1A, with a portion of the smaller diameter portion 1C being formed with a radially oriented indent 1D. Then, outside areas of the smaller diameter portion 1C and the indent 1D are covered with a portion of the trailing terminal member 2A so as to allow the trailing terminal member 2A to be coupled to the leading terminal member 1A such that the trailing terminal member 2A is entirely aligned in an outer shape with or slightly less than the leading terminal member 1A. When this takes place, the presence of the indent 1D formed in the smaller diameter portion 1C compels the synthetic resin of the trailing terminal member 2A to flow into the indent 1D for enabling the trailing terminal member 2A to be further reliably coupled to the leading terminal member 1A.

Here, it is preferable for the leading terminal member 1A to have an outer diameter of 1.25 mm or 2.5 mm in consideration of replacement capability with a related art SC type connector, a MU type connector or an LC type connector. Also, if the ratio $L/\phi$ of a length L of the leading terminal member 1A to an outer diameter $\phi$ thereof lies in a value ranging from approximately 1.5 to 3.0, optimally 2.0 to 2.8, then the leading terminal member 1A has an adequate function as the optical fiber composite ferrule.

Also, while the presently filed embodiment has been shown to have the flange section 3 made from the same synthetic resin of the trailing terminal member 2A in a unitary mold, since the flange section 3A has an outer circumferential periphery on which a spring is merely disposed with no high dimensional precision being necessarily required in terms of the function, the leading terminal member 1A may not be made of the same synthetic resin as the trailing terminal member 2A in the unitary mold, and instead thereof, the flange section 3 that is separately produced may be mounted to the ferrule base section 1.

Subsequently, results of temperature and moisture cycle tests conducted on the optical fiber composite ferrule of the presently filed embodiment are plotted in FIG. 4. Also, the outer dimension of the composite ferrule and comparative objects used in the current temperature and moisture cycle tests is illustrated in FIGS. 5A–5D.

The optical fiber composite ferrule (see FIG. 5A) of the presently filed embodiment forming an object of the current test includes the leading terminal member 1A made from zirconia ceramic with the linear expansion coefficient of $0.9 \times 10^{-5}$ and the trailing terminal member 2A made from the synthetic resin with the linear expansion coefficient of $0.9 \times 10^{-5}$. Further, the trailing terminal member 2A and the flange section 3 being unitarily molded with the same synthetic resin. Furthermore, the composite ferrule had the dimension with the diameter $\phi$ of 2.5 mm, a length L of the leading terminal member 1A lying in a value ranging approximately from 5 to 7 mm and the remaining length M of the other portion (inclusive of the trailing terminal member 2A and the flange section 3) lying in a range of approximately 9 to 11 mm.

When using this composite ferrule, a bare wire portion of the optical fiber, whose outer sheath is pealed off in a length (of approximately 5 to 7 mm) corresponding to the length of the wire insertion bore 1B disposed in the leading terminal member 1A, is inserted through the wire insertion bore 1B to allow the bare wire portion to be secured to the wire insertion bore 1B by an adhesive while the remaining covered portion is secured to the optical fiber core wire guide bore 2B by the adhesive.

A current type (with a flange made of SUS) ferrule (see FIG. 5B) prepared for an object to be compared includes a ferrule base section 1 unitarily made from zirconia ceramic with the linear expansion coefficient of $0.9 \times 10^{-5}$, and a flange section 3, made of SUS with the linear expansion coefficient of $1.3 \times 10^{-5}$, coupled to a rear end of the ferrule base section 1. This ferrule has a dimension with the diameter $\phi$ of 2.5 mm, a length L' between the ferrule base section 1 and an end face of the flange lying in a value ranging approximately 8 mm, and the remaining length M' of the other portion of the flange section 3 lying in a range of approximately 8 mm.

When using the current type (with the flange made of SUS) ferrule, a bare wire portion of the optical fiber, whose outer sheath is pealed off in a length (of approximately 10 mm) corresponding to the length of the wire insertion bore 1B disposed in the leading terminal member 1A, is inserted through the wire insertion bore 1B to allow the bare wire portion to be secured to the wire insertion bore 1B by an adhesive while the remaining covered portion is secured to the optical fiber core wire guide bore 2B by the adhesive.

Figure 5A:
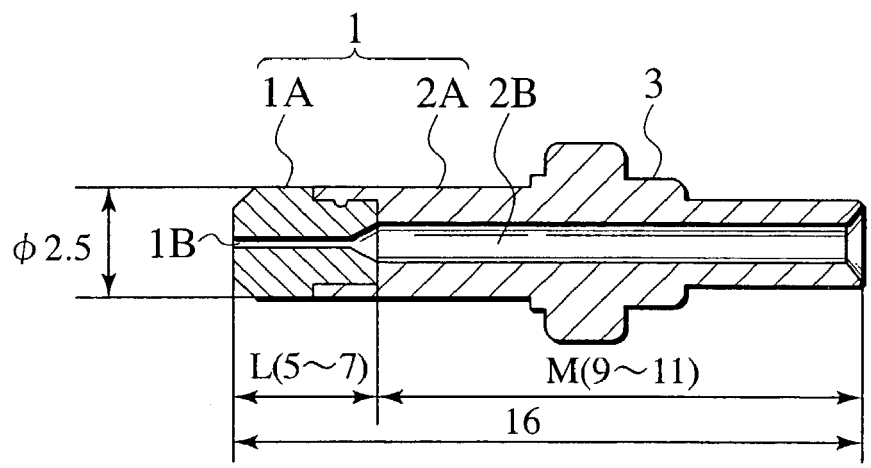
FIG. 5A shows an outer shape of the optical fiber composite ferrule 4 of the first embodiment which is an object for the temperature and moisture cycle test.
Figure 5B:
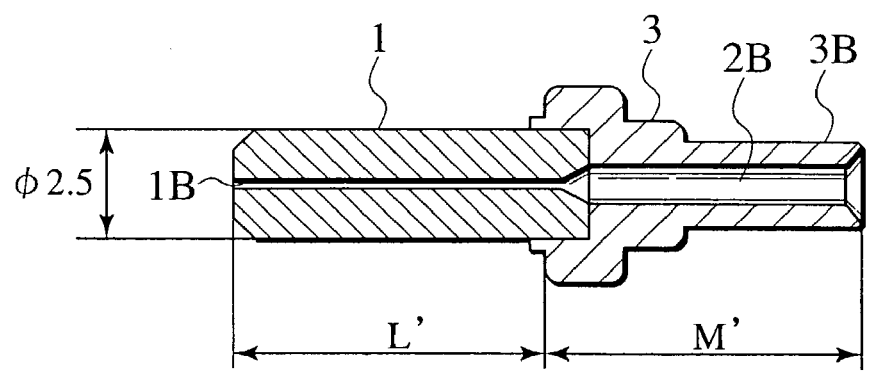
FIG. 5B shows an outer shape of the related art ferrule.

Similarly, another current type ferrule base section 1 (see FIG. 5C) prepared for an object to be compared includes a structure wherein the ferrule base section 1, made from zirconia ceramic, which is taken out from the current type (with the flange made of SUS) ferrule with the same dimension and material as those of ferrule base section 1 of the current type (with the flange made of SUS) ferrule shown in FIG. 5B.

Further, only the bare wire portion of the optical fiber is inserted through the wire insertion bore 1B disposed in the ferrule base section 1 and secured thereto by the adhesive.

Similarly, a leading terminal member 1A (see FIG. 5D) prepared for an object to be compared includes a structure wherein the leading terminal member 1A, made from zirconia ceramic, which is taken out from the optical fiber composite ferrule embodying the present invention with the same dimensions and materials as those of the optical fiber composite ferrule shown in FIG. 5A. Also, only the bare wire portion of the optical fiber is inserted through the wire insertion bore 1B disposed in the leading terminal member 1A and secured thereto by the adhesive. The above-described objects to be tested were subjected to the temperature and moisture cycle tests wherein a circumferential temperature was varied from −40° C. to +85° C. for periods of eight hours under the moisture of 95% RH. Here, as an evaluation and discrimination standard, the amount of displacement of the optical fiber with respect to the end face of the leading terminal member 1A is adopted because of the fact that the amount of displacement represents a function that adversely and directly affects connection loss in coupling two optical fibers through the use of the connector and correlation in difference in the linear expansion coefficient between the optical fiber and the ferrule. Thus, it is concluded that the smaller the amount of displacement, the better the property of the ferrule.

FIG. 4 shows how the amounts of displacements of the optical fibers at the end faces of the leading terminal members 1A translate in dependence on temperature variations.

It appears from FIG. 4 that the optical fiber composite ferrule (indicated by a curve A) of the presently filed embodiment has a lower amount of displacement of the optical fiber at the end face of the leading terminal member 1A than those of the current type (with the flange made from SUS) ferrule (indicated by a curve B) and the current type ferrule base section 1 (as indicated by a curve C) while exhibiting an excellent property.

Further, in view of the fact that only the leading terminal member 1A (as indicated by a curve D) has a less amount of displacement of the optical fiber at the end face than that achieved in the current type ferrule base section 1 (as indicated by a curve C), it is understood that, in case of employing the same material, the shorter the length of the optical fiber wire insertion bore 1B, the better the property of the ferrule.

That is, since the optical fiber composite ferrule (see FIG. 5A) of the presently filed embodiment is comprised of the trailing terminal member 2A of the ferrule base section 1 and the leading terminal member 1A (made of zirconia ceramic) which are made from the material having the substantially same linear expansion coefficient, the composite ferrule entirely has a lower linear coefficient than that of the current type (with the flange made from SUS) ferrule (see FIG. 5B), resulting in reduction in the amount of displacement of the optical fiber at the end face of the leading terminal member 1A.

Figure 5C:
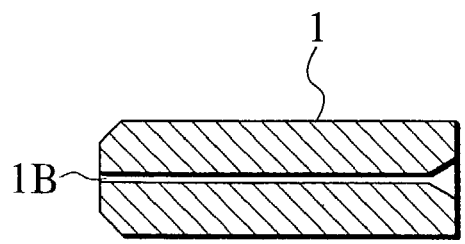
FIG. 5C shows an outer shape of a ferrule base section 1 of the related art.
Figure 5D:
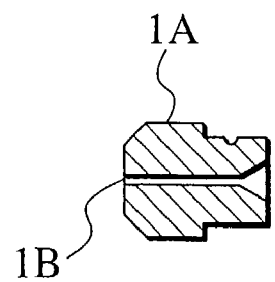
FIG. 5D shows an outer shape of a leading terminal member 1A of the optical fiber composite ferrule of the first embodiment.

Furthermore, the presence of the wire insertion bore 1B of the optical fiber composite ferrule (see FIG. 5A) of the presently filed embodiment having the shorter length than that of the wire insertion bore 1B of the current type ferrule base section 1 (see FIG. 5C) results in reduction in the amount of displacement of the optical fiber at the end face of the leading terminal member 1A than that of the current type ferrule base section 1 (see FIG. 5C).

Thus, according to the first embodiment, the length of the wire insertion bore 1B is made shorter than that of the current type ferrule base section 1 (see FIG. 5C) and the trailing terminal member 2A of the ferrule base section 1 has same linear expansion coefficient as that of the leading terminal member 1A, with a resultant capability of suppressing an increase in disconnection in the optical fiber in the ferrule caused by the surrounding temperature variation and connection loss (i.e., insertion loss and reflection loss).

Figure 6A:
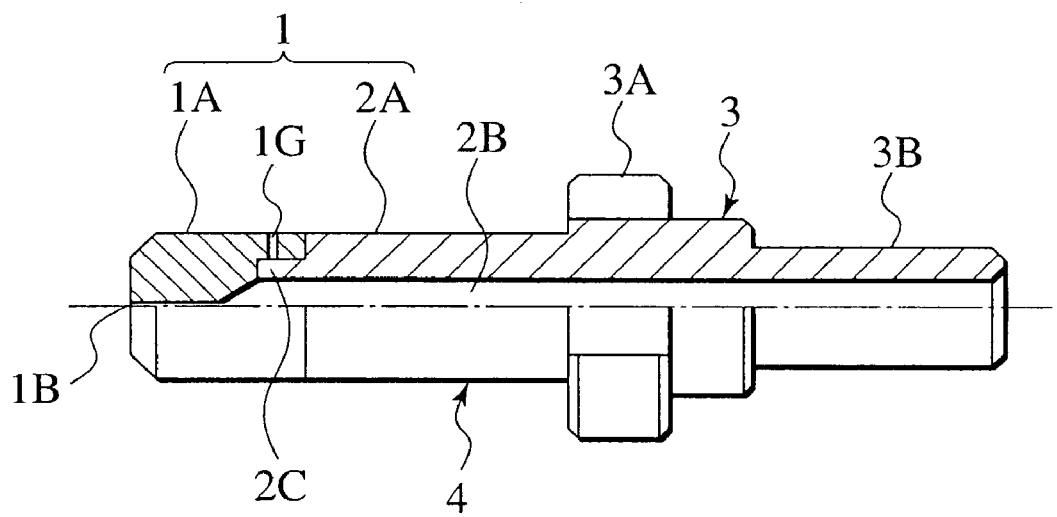
FIG. 6A is a partial cross sectional view of an optical fiber composite ferrule of a second embodiment according to the present invention.
Figure 6B:
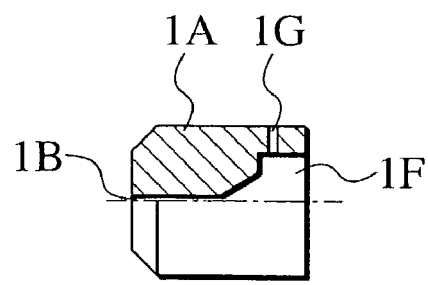
FIG. 6B is a cross sectional view of a leading terminal member 1A of the optical fiber composite ferrule shown in FIG. 6A.

Next, a second embodiment described below FIG. 6A is a partially cross sectional view illustrating a structure of an optical fiber composite ferrule of the second embodiment according to the present invention, and FIG. 6B is a cross sectional view of a leading terminal member forming part of the composite ferrule shown in FIG. 6A.

The second embodiment differs from the first embodiment in the shape of the leading terminal member 1A. That is, the leading terminal member 1A has an outer circumferential periphery forming an extended shape of an outer circumferential periphery of a trailing terminal member 2A. In particular, the leading terminal member 1A has a rear end wall formed with a cavity bore 1F, with a larger diameter than an inner diameter of an optical fiber core wire guide bore 2B formed in the trailing terminal member 2A, that extends from a trailing portion toward a head portion to communicate with an optical fiber wire insertion bore 1B formed in the leading terminal member 1A, and an inner peripheral wall of the cavity bore 1F is formed with at least one indent 1G.

The indent 1G exhibits an advantage in that, when implementing mold forming the trailing terminal member 2A, a portion 2C of a distal end portion of the trailing terminal member 2A flows into the indent 1G to preclude the trailing terminal member 2A from being rotated and slipping off with respect to the leading terminal member 1A.

The indent 1G may include at least one through-bore radially extending through the leading terminal member 1A or a recess formed at an inner peripheral wall of a concave portion or the cavity bore 1F so as to extend in an axial direction in a spiral form.

With the structure of the second embodiment, since the distal end portion 2C of the trailing terminal member 2A molded in the inner peripheral wall of the cavity bore 1F serves as a reinforcing means of the leading terminal member 1A, the leading terminal member 1A is enabled to have a shorter length than that of the first embodiment, resulting in further reduction in the manufacturing cost.

Assembling the optical fiber composite ferrule of such a structure into at least one of a connector housing and a plug case enables a new optical fiber connector to be provided.

As set forth above, with the optical fiber composite ferrule according to the present invention, since the portion except for the leading terminal member of the ferrule base section is made of synthetic resin with the linear expansion coefficient equal to or less than that of the leading terminal member of the ferrule base section, stress to be imparted to the optical fiber due to the surrounding temperature variation is lessened, thereby enabling suppression in an increase in disconnection of the optical fiber within the ferrule due to the surrounding temperature variation and connection loss (i.e., insertion loss and reflection loss).

The entire content of Japanese Patent Application No. P2002-048415 with a filing date of Feb. 25, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An optical fiber composite ferrule comprising:
   a ferrule base section which allows an optical fiber to be inserted, the ferrule base section including a leading terminal section made of a metallic alloy containing zirconia and having an optical fiber wire insertion bore, and a trailing terminal section made of a synthetic resin having a linear expansion coefficient equal to or less than that of the leading terminal section; and
   a flange section formed at one end of the trailing terminal section of the ferrule base section,
   wherein the synthetic resin is made of polybutylene terephthalate containing a carbon fibrous filler in a volume range between 20 and 50%.

2. The optical fiber composite ferrule according to claim 1, wherein the synthetic resin has a linear expansion coefficient substantially equal to a linear expansion coefficient ($0.4 \times 10^{-5}$) of the optical fiber.

3. The optical fiber composite ferrule according to claim 1, wherein the leading terminal section of the ferrule base section has an outer diameter of 2.5 mm or 1.25 mm.

4. The optical fiber composite ferrule according to claim 1, wherein the leading terminal section is formed to have a ratio $L/\phi$, between a length L in an axial direction and an outer diameter $\phi$ of the leading terminal section, in a range between 1.5 and 3.0.

5. The optical fiber composite ferrule according to claim 1, wherein the leading terminal section provides a rear portion with a smaller diameter portion than an outer diameter of the leading terminal section, and the smaller diameter portion also provides an outer circumferential periphery with at least one of indent portions along a radial direction of the leading terminal section.

6. The optical fiber composite ferrule according to claim 1, wherein the leading terminal section provides a cavity bore having a larger diameter than an inner diameter of the optical core wire guide bore and communicating with the optical fiber core wire insertion bore, and the cavity bore further provides an inner periphery with at least one of indent portions along a radial direction of the leading terminal section.

* * * * *